– – –
United States Patent [19]

Kluttz

[11] Patent Number: 4,928,218

[45] Date of Patent: May 22, 1990

[54] SWITCH MODE POWER SUPPLY START-UP CIRCUIT

[75] Inventor: James S. Kluttz, Winter Springs, Fla.

[73] Assignee: NCR Corporation, Dayton, Ohio

[21] Appl. No.: 319,601

[22] Filed: Mar. 6, 1989

[51] Int. Cl.[5] .................. H02M 5/458; H02M 7/5375
[52] U.S. Cl. ........................................ 363/37; 363/16; 363/49
[58] Field of Search ....................... 363/16, 37, 49, 44, 363/45, 47, 48

[56] References Cited

U.S. PATENT DOCUMENTS

| | | | |
|---|---|---|---|
| 3,349,313 | 10/1967 | Wilmarth | 363/49 |
| 3,935,511 | 1/1976 | Boulanger et al. | 363/45 |
| 4,130,862 | 12/1978 | Holt | 363/49 |
| 4,236,198 | 11/1980 | Ohsawa et al. | 363/49 |
| 4,344,122 | 8/1982 | Jones | 363/23 |
| 4,400,767 | 8/1983 | Fenter | 363/21 |
| 4,450,514 | 5/1984 | Peruth | 363/49 |
| 4,586,120 | 4/1986 | Malik et al. | 363/21 |
| 4,686,616 | 8/1987 | Williamson | 363/21 |
| 4,740,880 | 4/1988 | Peruth | 363/131 |
| 4,754,385 | 6/1988 | McDade et al. | 363/16 |

FOREIGN PATENT DOCUMENTS

| | | | |
|---|---|---|---|
| 3438251 | 4/1986 | Fed. Rep. of Germany | 363/45 |
| 123375 | 7/1983 | Japan | 363/49 |
| 91862 | 5/1985 | Japan | 363/49 |
| 189174 | 8/1986 | Japan . | |
| 1574805 | 9/1980 | United Kingdom | 363/45 |

OTHER PUBLICATIONS

Biaimonte et al., "Transistor Switching Regulator Starting and Monitoring", IBM Tech. Discl. Bul., vol. 23, No. 12, pp. 5449-5451, May 1981.

*Primary Examiner*—William H. Beha, Jr.
*Attorney, Agent, or Firm*—Wilbert Hawk, Jr.; Stephen F. Jewett; James M. Stover

[57] ABSTRACT

A switch mode power supply includes an AC to DC converter, a pulse width modulator for generating a series of pulses to control the switching of the DC across the primary winding of a transformer, and a start-up circuit connecting the AC to a power input of the pulse width modulator. A thermistor provides thermal protection for converter and start-up circuit components during abnormal operation, and a switch for disconnecting the start-up circuit and bypassing the thermistor after the power supply has been started improves power supply efficiency by eliminating power loss through the start-up circuit and thermistor.

5 Claims, 2 Drawing Sheets

SWITCH MODE POWER SUPPLY START-UP CIRCUIT

The present invention relates to a switch mode power supply, and, more particularly, to a start-up circuit for use therein.

BACKGROUND OF THE INVENTION

Most electronic and computer systems require DC voltage for their operation. A typical power supply for such systems converts AC line current to a regulated DC voltage. A "switch mode" type power supply first converts AC to an unregulated DC which is then controllably pulsed to a regulated DC output. For example, conversion of AC to an unregulated DC may be achieved by rectifying the AC and storing the nonregulated DC voltage in bulk capacitors. Current from the bulk capacitors is then periodically switched or pulsed across a primary winding of a transformer. The resulting square wave is received by a secondary winding of the transformer, rectified, regulated, and stored in capacitors which provide the primary DC output voltage of the power supply.

The means used for switching current from the bulk capacitors may be transistors controlled by a series of pulses. These pulses are provided by a pulse width modulator (PWM) chip. In order to generate pulses, the PWM requires a predetermined input voltage. Some power supplies are designed so that during operation the PWM input voltage is provided by an auxiliary voltage obtained from a secondary winding or primary winding output of the transformer. However, in order to power the PWM chip when power is not available from the transformer, some type of start-up circuit is required. Some prior art start-up circuits consist of a circuit connecting the bulk capacitors to the PWM input. One problem with such start-up circuits is that they continue to drain current after the power supply is up and running and obtaining PWM input voltage from the transformer.

Other problems with start-up circuits relate to the fact that they are not independent of other components of the power supply. For example, power supplies for equipment such as a printer may receive a relatively large initial power demand when the printer is first turned on. Such power demands may prevent the primary winding output of the transformer from providing the auxiliary voltage needed for the PWM. However, because of the large demand for power, it may be undesirable to continue to drain current through the start-up circuit during this transitory, high demand period.

A further problem for start-up circuits may be caused by an abnormal condition on the output such as a short circuit or overload. The unusually large power drain may again reduce the auxiliary voltage from the level needed to power the PWM. This will increase the current flow through the start-up circuit as it attempts to provide the needed power. The longer or more frequent the demand for power from the start-up circuit, the larger the start-up circuit elements need to be. Larger elements require more layout space and generally add to the expense of power supply production.

Some power supplies are designed to switch off immediately when an abnormal condition occurs on the output. For those power supplies which do not immediately switch off, an abnormal condition on the output will not only increase demands on the start-up circuit, but the bulk capacitors too will draw increased current. The bulk capacitor charging current at power supply turn on is sometimes referred to as the in-rush current. Limiting the in-rush current will prevent overheating. When the in-rush current is limited there is no need to continue to power the PWM through the start-up circuit since the bulk capacitors are not being charged.

OBJECTS OF THE INVENTION

It is therefore an object of the present invention to provide a new and improved switch mode power supply.

It is another object of the present invention to provide a new and improved start-up circuit for a switch mode power supply.

It is a further object of the present invention to provide a start-up circuit for a switch mode power supply that draws no current after the initial start up and during normal operation of the power supply.

It is yet another object of the present invention to provide a switch mode power supply and start-up circuit for use with high initial power demand equipment wherein the start-up circuit draws no current during the initial power demand of the equipment.

It is yet a further object of the present invention to provide, for a switch mode power supply, a start-up circuit with reduced element sizes.

It is still another object of the present invention to provide a switch mode power supply which limits in-rush current.

It is still a further object of the present invention to provide a means for protecting a switch mode power supply and start-up circuit from overheating during abnormal operation of the power supply.

SUMMARY OF THE INVENTION

According to one form of the present invention a switch mode power supply comprises means for converting an AC input voltage to a DC voltage, a transformer having a primary winding, primary winding output and secondary winding, means for generating a series of pulses, and means responsive to the pulses for switching the DC voltage across the primary winding of the transformer. The power supply also comprises a charge storage device connected to a power input of the pulse generating means, and an auxiliary voltage generator connecting the primary winding output of the transformer to the power input of the pulse generating means. The power supply further includes a start-up circuit connecting the AC input voltage to the charge storage device, and switch means responsive to the current in the primary winding output for disconnecting the start-up circuit from the charge storage device.

Another form of the present invention is an improvement for a switch mode power supply. The power supply has an AC to DC converter and a pulse width modulator for generating a series of pulses to control the switching of the DC across the primary winding of a transformer. The improvement comprises a start-up circuit connecting the AC to a power input of the pulse width modulator, a first thermistor for limiting the AC in the converter and start-up circuit, and a switch for disconnecting the start-up circuit and bypassing the thermistor.

DESCRIPTION OF A PREFERRED EMBODIMENT

Figure 1A:
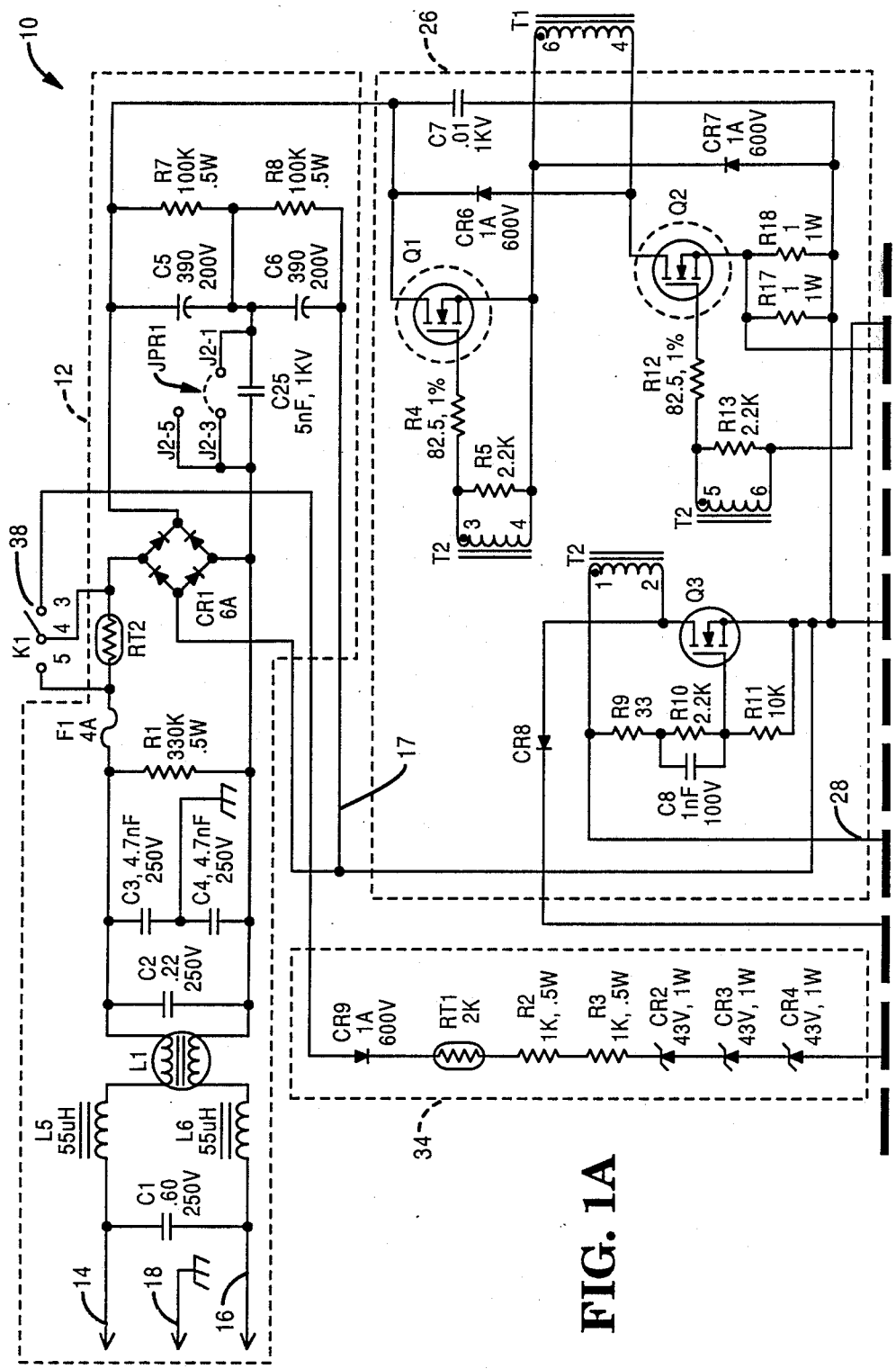
FIGS. 1A and 1B show a switch mode power supply according to one form of the present invention.
Figure 1B:
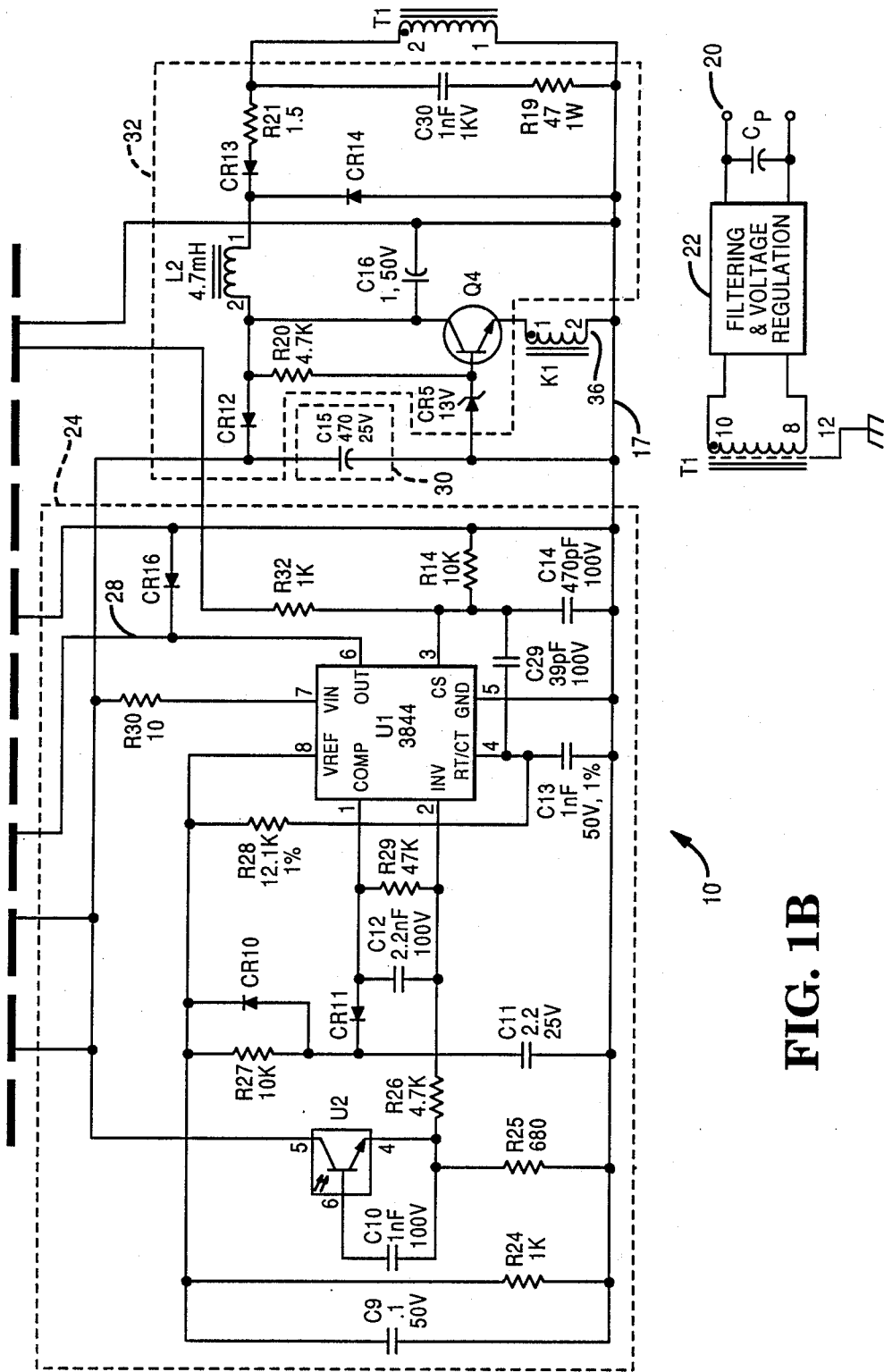

FIGS. 1A and 1B show a switch mode power supply 10. Referring first to FIG. 1A, power supply 10 includes a means for converting an AC input voltage to a DC voltage in the form of AC to DC converter 12. Converter 12 includes an AC input line 14, an AC neutral line 16, and an earth ground line 18. Capacitors C1, C2, C3, and C4, inductors L1, L5, and L6, and resistor R1 are provided for noise filtering. They filter out conductive emissions from power supply 10 in order to reduce electromagnetic interference otherwise produced by power supply 10. They do not affect the AC input signal and form no part of the claimed invention. Converter 12 also includes a positive temperature coefficient thermistor RT2 series connected in AC input line 14. The function of thermistor RT2 will be described later. However, a positive temperature thermistor has the characteristic that its resistance increases when its temperature exceeds a predetermined value. When the resistance of thermistor RT2 increases, the AC in-rush current is limited thereby preventing overheating due to repetitive on/off cycling of power supply 10 during an abnormal condition on the output. In a preferred embodiment, the resistance of RT2 increases from 40 ohms to 40,000 ohms when its temperature exceeds 110° C. Converter 12 also includes a full wave bridge rectifier CR1 and bulk storage capacitors C5 and C6 for storing a DC voltage. Rectifier CR1 is connected between thermistor RT2 on the AC side and capacitor C5 on the DC side. Resistors R7 and R8 provide a safety voltage bleed of bulk capacitors C5 and C6 when power supply 10 is turned off. Connector 2-3 is connected to connector 2-1 when the AC input voltage is about 115 volts, and connector 2-3 is connected to connector 2-5 by way of a jumper JPR1 when the AC input voltage is about 230 volts. Capacitor C25 is provided for filtering.

Power supply 10 also includes a transformer T1 having a primary winding marked by pins 6 and 4 (winding 6-4), primary winding output (see FIG. 1B) marked by pins 2 and 1 (winding 2-1), and a secondary winding marked by pins 10 and 8 (winding 10-8). Secondary winding 10-8 provides power for capacitor $C_p$ at the primary DC output 20. A filter and voltage regulator 22 is interposed between winding 10-8 and output 20.

Power supply 10 further includes means 24 (FIG. 1B) for generating a series of pulses, and means 26 (FIG. 1A) responsive to the pulses for switching the DC voltage stored on bulk capacitors C5 and C6 across primary winding 6-4 of transformer T1. Referring to FIG. 1B, at the heart of means 24 is a pulse width modulator (PWM) chip U1, which in a preferred embodiment is a 3844 control chip. Of particular interest on PWM U1 are input pin 7 and output pin 6. When the DC input voltage on pin 7 exceeds about 16 volts a series of pulses is generated on output pin 6. Referring to FIG. 1A, means 26 is a transistor switching circuit and includes a transformer T2 and transistors Q1 and Q2. In a preferred embodiment, transistors Q1 and Q4 are 400 volt, 5.5 amp MOSFETs. For example, each may be an IRF730 chip. Pulses received from PWM U1 on line 28 appear on the primary winding 1-2 of transformer T2, and are picked up on secondary windings 3-4 and 5-6. Transistors Q1 and Q2 turn on in response to the pulses on windings 3-4 and 5-6, respectively. In this manner, the DC voltage on bulk capacitors C5 and C6 is switched across primary winding 6-4 of transformer T1.

Referring again to FIG. 1B, a charge storage device 30 is connected to power input pin 7 of PWM U1. In the preferred embodiment shown, charge storage device 30 includes a storage capacitor C15 connected between PWM input pin 7 and primary DC voltage return line 17.

Power supply 10 further comprises an auxiliary voltage generator 32. Auxiliary voltage generator 32 connects primary winding output 2-1 of transformer T1 to power input pin 7 of PWM U1. Generator 32 comprises a transistor Q4 and a filter in the form of inductor L2 connected between the primary winding output 2-1 of transformer T1 and transistor Q4. Generator 32 also comprises resistors R19, R20, and R21, diodes CR12, CR13, and CR14, capacitors C16 and C30 and zener diode CR5. Transistor Q4 has collector, emitter, and base electrodes. Diode CR12 is connected between transistor Q4 and storage capacitor C15, with its anode connected to the collector of transistor Q4 and its cathode connected to storage capacitor C15. Zener diode CR5 is connected between primary DC voltage return line 17 and the base of transistor Q4, with its anode connected to line 17 and its cathode connected to the base. Resistor R20 is connected between the control electrode or base of transistor Q4 and the junction between inductor L2 and diode CR12. Resistor R21 and diode CR13 are series connected between pin 2 of primary winding output 2-1 of transformer T1 and inductor L2. Diode CR14 is connected between primary DC voltage return line 17 and the junction between diode CR13 and inductor L2. The cathodes of diodes CR13 and CR14 are connected to inductor L2. Capacitor C30 and resistor R19 are series connected between pin 2 of primary winding output 2-1 of transformer T1 and primary DC voltage return line 17.

Power supply 10 further includes a start-up circuit 34 (FIG. 1A) and switch means or relay K1 for disconnecting start-up circuit 34. Relay K1 has a coil 36 (FIG. 1B) and armature 38 (FIG. 1A). Coil 36 of relay K1 is series connected with transistor Q4 between primary DC voltage return line 17 and inductor L2, with relay coil 36 being connected to the emitter of transistor Q4. The armature 38 of relay K1 has two positions. In its non-energized position (pins 4 and 3 connected) it connects thermistor RT2 in series with start-up circuit 34. With armature 38 in its non-energized position both converter 12 and start-up circuit 34 are overload protected by thermistor RT2's ability to limit in-rush current during a high line condition. In its energized position, in response to a current in coil 36, armature 38 of relay K1 short circuits thermistor RT2. When armature 38 assumes its energized position (pins 4 and 5 connected) start-up circuit 34 is disconnected from the AC input and thermistor RT2 is bypassed. The bypassing of RT2 further reduces power dissipation after start-up and during normal operation of power supply 10.

Start-up circuit 34 (FIG. 1A) connects the AC input voltage on input line 14 to storage capacitor C15 (FIG. 1B), storage capacitor C15 being connected between start-up circuit 34 and primary DC voltage return line 17. Start-up circuit 34 includes series connected diode CR9, thermistor RT1, resistors R2 and R3, and zener diodes CR2, CR3 and CR4. The anode of diode CR9 is connected to the AC side of start-up circuit 34 and the cathode of diode CR9 is connected to thermistor RT1. Diode CR9 rectifies the AC input voltage. Thermistor RT1 prevents overheating of start-up circuit 34 during an abnormal condition on the output and in a preferred embodiment has a resistance which increases from 2,000 ohms to 200,000 ohms when its temperature exceeds 100° C. Zener diodes CR2, CR3, and CR4 are positioned with their anodes facing storage capacitor C15, thereby preventing start-up circuit 34 from conducting when the AC input voltage is below the breakdown voltage of the zener diodes. Zener diodes CR2, CR3, and CR4 may be replaced with a single zener diode of an equivalent size without departing from the invention. In a preferred embodiment, the breakdown voltage is about 129 volts.

In operation, when power supply 10 is first turned on, there is little or no charge on capacitor C15. Thus, PWM U1 is not producing output pulses and transistor switching circuit 26 is not switching a current through transformer T1. Since primary winding output 2-1 of transformer T1 is not receiving current, coil 36 of relay K1 is not receiving current. Armature 38 of relay K1, in its non-energized position, connects pins 4 and 3. If the peak AC input voltage exceeds the breakdown voltage of zener diodes CR2, CR3, and CR4, diode CR9 rectifies the AC waveform and charge begins to build on storage capacitor C15. At the same time the input waveform is rectified by bridge rectifier CR1 and bulk capacitors C5 and C6 start to charge.

As described more fully hereinafter, when the charge on capacitor C15 exceeds a predetermined value, in a preferred embodiment about 16 volts, relay K1 will respond to current in primary winding output 2-1 of transformer T1 and will disconnect the AC input voltage from start-up circuit 34. More particularly, PWM U1 generates a series of pulses and switching circuit 26 begins to switch current from bulk capacitors C5 and C6 over the primary winding 6-4 of transformer T1. Current is picked up by secondary winding 108 to charge primary DC output $C_p$. Current is also picked up by primary winding output 2-1 of transformer T1. The current picked up by primary winding output 2-1 of transformer T1 is rectified by diodes CR13 and CR14 and filtered by inductor L2. The output of inductor L2 is about 17 volts which provides power to input pin 7 of PWM U1. The voltage at the base of transistor Q4 is sufficiently high (about 12.7 volts) to turn Q4 on, thereby allowing current to flow through Q4 and coil 36 of relay K1. Current in coil 36 switches armature 38 of relay K1 to contact pins 4 and 5, thereby short circuiting thermistor RT2. Bulk capacitors C5 and C6 will continue to charge from the AC input line 14, but start-up circuit 34 is disconnected and thermistor RT2 is bypassed. Thus, after steady-state operation is reached, there is no drain through start-up circuit 34 and PWM U1 is powered through auxiliary voltage generator 32.

If an abnormal condition should occur on primary DC output 20, the operation of power supply 10 may be affected. For example, if an unusually high power demand occurs, such as through an overload, the current received by primary winding output 2-1 of transformer T1 will drop. If the input voltage to PWM U1 drops below a threshold input voltage (about 10 volts), PWM U1 will stop producing pulses, thereby turning off transistor switching circuit 26. This stops the current flow in primary winding output 2-1 of transformer T1, shutting off transistor Q4 and cutting off current flow through coil 36 of relay K1. Armature 38 of relay K1 will then reconnect start-up circuit 34 and storage capacitor C15 will recharge. Once capacitor C15 is charge, PWM U1 will again produce pulses, activating transformer T1. In this manner, power supply 10 will cycle on and off until the abnormal condition is removed.

Repeated cycling during an abnormal output condition will heat up the components of start-up circuit 34. However, when the temperature of thermistor RT2 exceeds a predetermined value, its resistance increases and the AC in-rush current is limited. Start-up circuit 34 is further protected from overheating by thermistor RT1. As the temperature of thermistor RT2 reaches its switch temperature, the frequency of cycling on/off is reduced. Under some conditions power supply 10 will stay off for an indefinite period of time (until AC power is removed and thermistor RT2 cools to below its switch temperature). In the event that the AC input line is low (less than about 90 Vac) thermistor RT2 will not switch to its high resistance state and thermistor RT1 will protect start-up circuit 34 components from overheating. When thermistor RT1 reaches its switch temperature, the current through start-up circuit 34 is greatly reduced thereby limiting the power dissipation on the circuit 34 components.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A switch mode power supply comprising:
    means for converting an AC input voltage to a DC voltage, including an AC input line and a first positive temperature coefficient thermistor series connected in said line;
    a transformer having a primary winding, primary winding output, and secondary winding;
    means for generating a series of pulses;
    means responsive to said pulses for switching said DC voltage across the primary winding of said transformer;
    a charge storage device connected to a power input of said pulse generating means, said charge storage device comprising a storage capacitor connected between said start-up circuit and a primary DC return line;
    an auxiliary voltage generator connecting the primary winding output of said transformer to said power input of said pulse generating means, said auxiliary voltage generator comprising a transistor and filter, said filter including an inductor connected between said primary winding output and transistor, said transistor and relay coil being series connected between said filter and primary DC voltage return line and said transistor having a control electrode connected through a first resistor to the junction of said filter and transistor;
    a start-up circuit connecting said AC input voltage to said charge storage device; and
    switch means responsive to the current in said primary winding output for disconnecting said start-up circuit from said charge storage device, said switch means including a relay having a coil and armature, said armature having a first and second position, wherein said first position series connects said first thermistor with said start-up circuit, wherein said second position short circuits said first thermistor, and wherein said armature assumes said second position in response to a current in said coil.

2. The switch mode power supply of claim 1 wherein said transistor has collector, emitter, and base electrodes, wherein said inductor is connected between said primary winding output and said collector, and wherein said auxiliary voltage generator comprises:
   a first diode connected between said collector and said storage capacitor.

3. The switch mode power supply of claim 2 wherein said auxiliary voltage generator comprises:
   a first zener diode connected between said primary DC voltage return line and said base;
   a second resistor and second diode series connected between said primary winding output and said inductor; and
   a third diode connected between said primary DC voltage return line and the junction between said second diode and said inductor.

4. A switch mode power supply comprising:
   means for converting an AC input voltage to a DC voltage;
   a transformer having a primary winding, primary winding output, and secondary winding;
   means for generating a series of pulses;
   means responsive to said pulses for switching said DC voltage across the primary winding of said transformer;
   a charge storage device connected to a power input of said pulse generating means, said charge storage device comprising a storage capacitor connected between said power input and a primary DC return line;
   an auxiliary voltage generator connecting the primary winding output of said transformer to said power input of said pulse generating means, said auxiliary voltage generator comprising:
   a transistor having collector, emitter and base electrodes;
   a filter including an inductor connected between said primary winding output and said collector;
   a first resistor connected between said base and the junction of said filter and transistor; and
   a first diode connected between said collector and said storage capacitor;
   a start-up circuit connecting said AC input voltage to said charge storage device; and
   switch means responsive to the current in said primary winding output for disconnecting said start-up circuit from said charge storage device, said switch means including a relay having a coil and armature, said coil being series connected between said emitter and primary DC voltage return line, said coil being responsive to the current from the primary winding output connected to said auxiliary voltage generator.

5. The switch mode power supply of claim 2 wherein said auxiliary voltage generator comprises:
   a first zener diode connected between said primary DC voltage return line and said base;
   a second resistor and second diode series connected between said primary winding output and said inductor; and
   a third diode connected between said primary DC voltage return line and the junction between said second diode and said inductor.

* * * * *